US010292243B2

(12) United States Patent
Lin et al.

(10) Patent No.: US 10,292,243 B2
(45) Date of Patent: May 14, 2019

(54) CONTROLLER OF AN LED FOR RECEIVING A REMOTE CONTROL SIGNAL

(71) Applicant: Changzhou Jutai Electronic Co., Ltd., Changhzou (CN)

(72) Inventors: Jun Lin, Changzhou (CN); Chengqian Pan, Changzhou (CN); Bin Chen, Changzhou (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 27 days.

(21) Appl. No.: 15/610,594

(22) Filed: May 31, 2017

(65) Prior Publication Data

US 2018/0255623 A1    Sep. 6, 2018

(30) Foreign Application Priority Data

Mar. 1, 2017    (CN) ..................... 2017 2 0188682 U

(51) Int. Cl.
*H05B 33/08*    (2006.01)
*H05B 37/02*    (2006.01)
(Continued)

(52) U.S. Cl.
CPC ......... *H05B 37/0245* (2013.01); *G08C 17/02* (2013.01); *H05B 33/0815* (2013.01);
(Continued)

(58) Field of Classification Search
CPC ............ H05B 33/0803; H05B 33/0809; H05B 33/0815; H05B 33/0842; H05B 33/0845; H05B 33/0857; H05B 33/0854; H05B 33/08; H05B 33/0821; H05B 33/0863; H05B 33/0872; H05B 37/0272; H05B 37/02; H05B 37/0218; H05B 37/0227; H05B 37/0245; H05B 37/0209; H05B 37/0281; H05B 41/24; H05B 41/2806; H05B 41/3924; H05B 41/3927
See application file for complete search history.

(56) References Cited

U.S. PATENT DOCUMENTS 5,237,264 A * 8/1993 Moseley ................ G08C 17/00
                                                          315/291
5,489,891 A * 2/1996 Diong .................... G08B 13/19
                                                          315/133
(Continued)

FOREIGN PATENT DOCUMENTS

CN    203523098 U    4/2014
CN    205179451 U    4/2016

*Primary Examiner* — Tung X Le
*Assistant Examiner* — Borna Alaeddini
(74) *Attorney, Agent, or Firm* — W&K IP

(57) ABSTRACT

The invention discloses that a controller of an LED for receiving a remote control signal, comprising a DC power source, and further comprising: a remote control transmitter for issuing a control command by a users: a remote control signal receiving module, for receiving a signal of the remote control transmitter, the remote control signal receiving module is electrically connected with the DC power source; a control circuit, which is electrically connected with an output end of the remote control signal receiving module and of the DC power source respectively, and converts a command signal from the remote control signal receiving module into a switching signal output; a drive circuit, which is connected to an output end of the DC power source and of the control circuit respectively, the drive circuit is turned on or turned off under a control signal of the control circuit to control that the DC power source outputs to a load. The invention enables a user to have more choices for the operation of the controller.

4 Claims, 7 Drawing Sheets

(51) Int. Cl.
*G08C 17/02* (2006.01)
*F21Y 115/10* (2016.01)

(52) U.S. Cl.
CPC ..... *H05B 33/0842* (2013.01); *H05B 37/0272* (2013.01); *F21Y 2115/10* (2016.08); *Y02B 20/346* (2013.01)

(58) Field of Classification Search

(56) References Cited

U.S. PATENT DOCUMENTS

| | | | | |
|---|---|---|---|---|
| 8,009,042 B2* | 8/2011 | Steiner | ............... | H05B 37/0227 340/541 |
| 8,350,479 B1* | 1/2013 | Brazille, II | ............... | F21K 9/23 315/34 |
| 8,770,771 B2* | 7/2014 | Preta | ............... | B60Q 1/0023 340/438 |
| 8,922,125 B2* | 12/2014 | Lin | ............... | H05B 37/0227 315/149 |
| 8,953,351 B2* | 2/2015 | Mi | ............... | H02M 1/36 363/127 |
| 2012/0043889 A1* | 2/2012 | Recker | ............... | H05B 33/0815 315/86 |
| 2012/0074868 A1* | 3/2012 | Tseng | ............... | H05B 33/0815 315/294 |
| 2016/0109083 A1* | 4/2016 | Li | ............... | F21S 10/046 362/84 |
| 2018/0116020 A1* | 4/2018 | Beghelli | ............ | H05B 33/0815 |

\* cited by examiner

CONTROLLER OF AN LED FOR RECEIVING A REMOTE CONTROL SIGNAL

CROSS-REFERENCE TO RELATED APPLICATIONS

This application claims priority to Chinese Patent Application No. 201720188682.2 with a filing date of Mar. 1, 2017. The content of the aforementioned applications, including any intervening amendments thereto, are incorporated herein by reference.

TECHNICAL FIELD

The invention relates to a controller of an LED for receiving a remote control signal.

BACKGROUND OF THE PRESENT INVENTION

A LED string light has a lighting decorative effect at night because of a variety of shapes and lights flashing, at the same time, it is also the first choice for people to add atmosphere. In order to enhance the decorative effect of the string light, a number of flash bubbles are arranged at regular intervals on the string light usually, to thereby make the entire string light with a flashing dynamic effect. The existing flash bubbles in the market, if which are directly in series on the string light, will lead to the entire light string flashing unsteadily, and will affect the normal lights of other light bodies, affect the beauty, and less than expected results. And the flashable bulbs device consumes a large current, while the current changes are also larger, affecting the safety.

At present, there are a variety of light-emitting mode for the LED lights, whose light-emitting modes are controlled by a drive circuit, however, the current drive circuit through a form of key switches to control it, in the intelligent era today, the control for the LED lights are more limited.

SUMMARY OF PRESENT INVENTION

In view of the above technical problems, the object of the invention is to provide a controller of an LED for receiving a remote control signal, and the invention enables a user to have more choices for the operation of the controller.

The technical solutions which solve the above technical problems are as follows:

a controller of an LED for receiving a remote control signal, comprising a DC power source, further comprising:

a remote control transmitter for issuing a control command by a user.

a remote control signal receiving module, for receiving a signal of the remote control transmitter, the remote control signal receiving module is electrically connected with the DC power source;

a control circuit, which is electrically connected with an output end of the remote control signal receiving module and of the DC power source respectively, and converts a command signal from the remote control signal receiving module into a switching signal output;

a drive circuit, which is connected to an output end of the DC power source and of the control circuit respectively, the drive circuit is turned on or turned off under a control signal of the control circuit to control that the DC power source outputs to a load.

The invention is characterized in that the invention can change the working state of the output signal of the control circuit at any time by the remote control transmitter or the key, thereby changing the switching changes of the driving circuit to change the flash changes of the LED string light. By pressing a timer button of the remote control transmitter or long pressing the key, the controller is switched into a timer mode and starts counting, after 6 hours (or 8 hours), the power is turned off and then the power is turned on again after 18 hours (or 16 hours), and so cycles. Therefore, the invention is based on the prior art, and a user can control the controller by manipulating the remote control, enabling the user to have more choices for the operation.

DETAILED DESCRIPTION OF PREFERRED EMBODIMENTS

Example One

Figure 1:
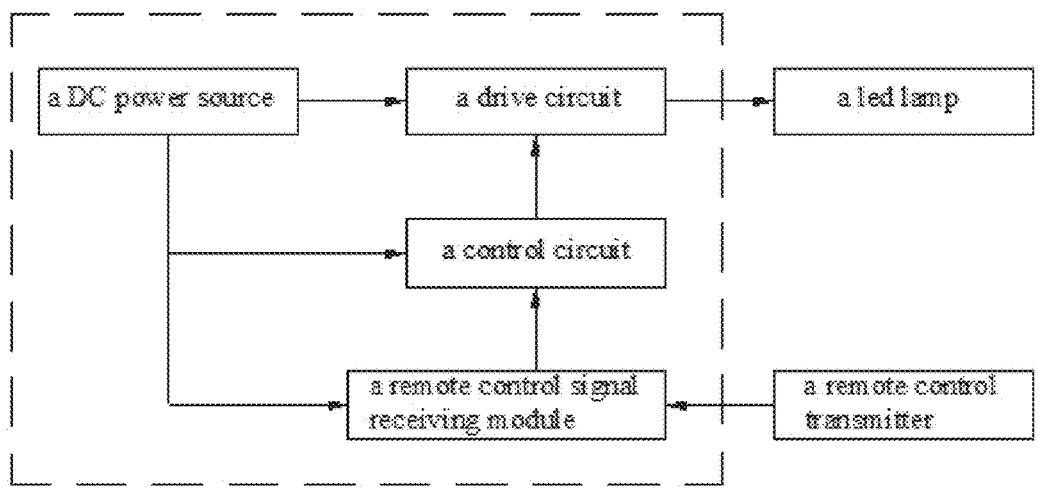
FIG. 1 is a block diagram of a controller of an LED for receiving a remote control signal.

As described in FIG. 1, a controller of an LED for receiving a remote control signal according to the invention, comprising: a DC power source; a remote control transmitter for issuing a control command by a users: a remote control signal receiving module, for receiving a signal of the remote control transmitter, the remote control signal receiving module is electrically connected with the DC power source; a control circuit, which is electrically connected with an output end of the remote control signal receiving module and of the DC power source respectively, and converts a command signal from the remote control signal receiving module into a switching signal output; a drive circuit, which is connected to an output end of the DC power source and of the control circuit respectively, the drive circuit is turned on or turned off under a control signal of the control circuit to control that the DC power source outputs to a load.

Figure 2:
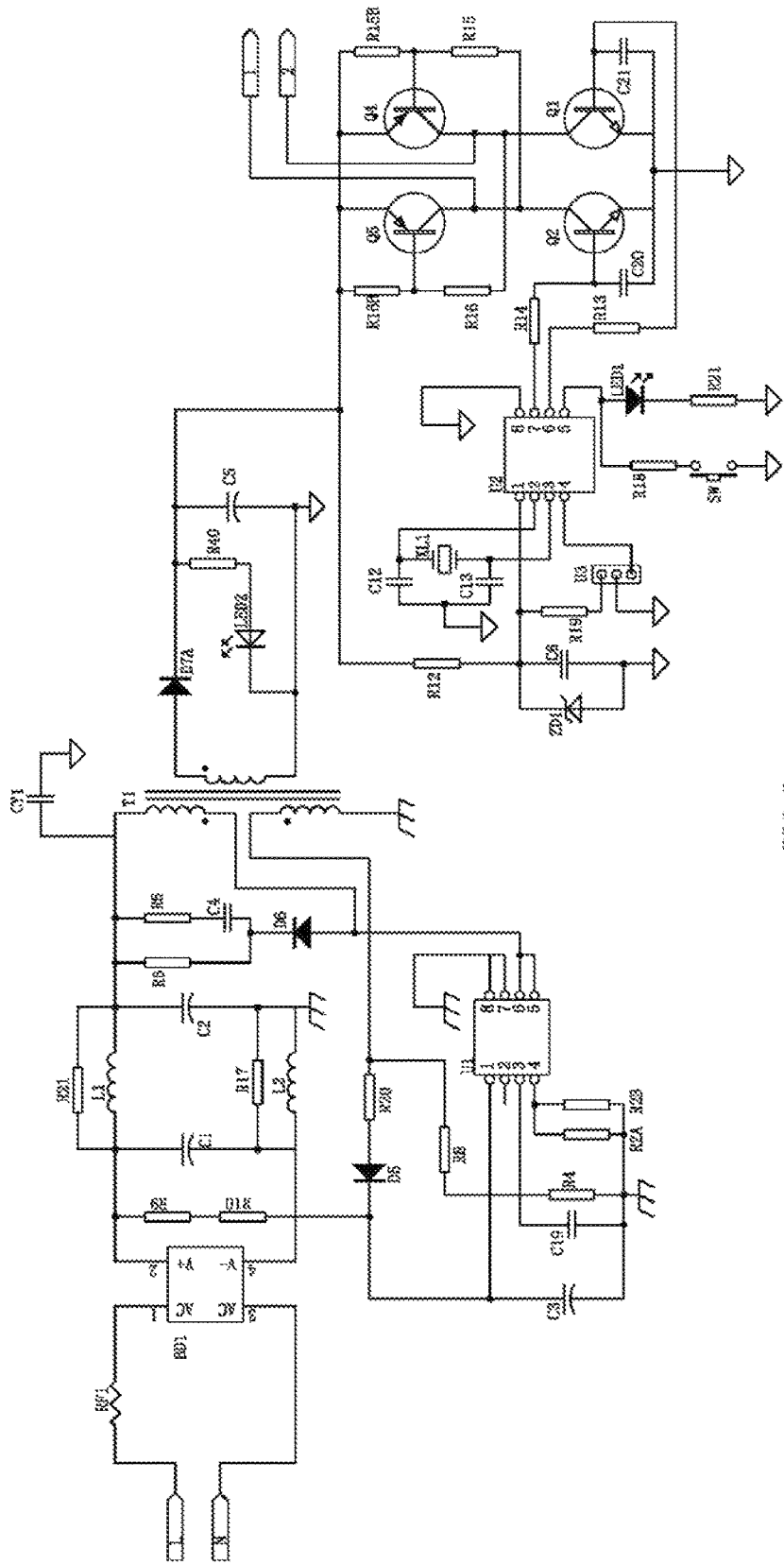
FIG. 2 is a circuit schematic diagram of a first embodiment of the invention.
Figure 7:
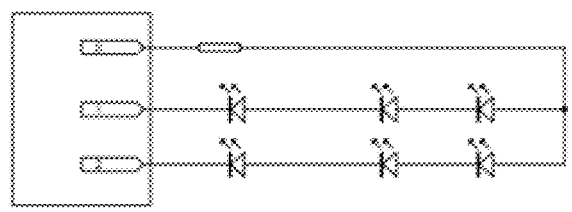

As shown in FIG. 2, as a first embodiment of the above controller, wherein a type of a power control chip U1 of the DC power source is CR6348, the DC power source is regulated by a zener diode ZD1 via a twelfth resistor R12, and then is supplied to other circuits, the remaining structures of DC power source are similar to that of the patent of Patent Application No. CN201621232377.0. The remote control transmitter is provided with a plurality of keys for controlling that the LED lamps work under different conditions, the keys comprise a timing button, a button for adjusting the brightness, a button for lights flashing modes (the lights flashing modes are same as that of the Public No. CN203523098U, namely the lights flashing modes comprise: dimming, wave-like changes, happy style changes, single lamp dimmed, double lamps dimmed, stars twinkling, and always brightness, etc.). The structures of a bridge drive circuit are similar to that of FIG. 7 disclosed in the Public No. CN205179451U, so here do not repeat this. The control circuit comprises a microcontroller U2 and a clock circuit composed of a crystal oscillator XL1, a twelfth capacitor C12 and a thirteenth capacitor C13, both ends of the crystal oscillator XL1 are connected with one end of the twelfth capacitor C12 and of the thirteenth capacitor C13 respectively, the other end of the twelfth capacitor C12 and of the thirteenth capacitor C12 is grounded, and both ends of the crystal oscillator XL1 are connected with the microcontroller respectively, the type of the microcontroller U2 is JT-042M, when the microcontroller receives a timing signal, such as of the remote control transmitter, the controller is switched into the working state, and the clock circuit provides a clock signal for the microcontroller, to guarantee accurate timing of the controller. The timing mode is that: long press the key for t seconds or the controller is switched into the timing mode by manipulating the timing button of the remote control transmitter, and start timer, and after T1 hours the power supply is off, then after T2 hours the power supply is on again, so cycles. The sum of T1 and T2 is 24 hours. T is 0-10 seconds, T1 is 0-24 hours, and T2 is 0-24 hours. For example, t is 3 seconds, T1 is 6 or 8 hours, and T2 is 18 or 16 hours. For the remote control signal receiving module in this embodiment. It is the infrared signal receiving circuit, which comprises an infrared receiving head U3 and a nineteenth resistor R19, the infrared receiving head U3 is connected with the control circuit, i.e., the infrared receiving head U3 is connected with the microcontroller U2, the type of the infrared receiver U3 is HBS838, and the infrared receiving head U3 matches with the remote control transmitter. One end of the nineteenth resistor R19 is electrically connected with an output end of the DC power supply, and the other end of the nineteenth resistor R19 is electrically connected with the infrared receiving head U3. The infrared receiving head U3 is installed in the controller, and the housing of the controller is made of material with good transparency of the infrared light. The controller is provided with a position indicator lamp LED2 inside for the infrared receiving head U3, to remind the user a direction on which the infrared remote controller is needed to align. The position indicator lamp LED2 for the infrared receiving head U3 is connected with the fortieth resistor R40 in series, and then one end is connected with the DC power supply, and the other end is grounded. For this example, it also comprises a key SW, whose one end is electrically connected with the control circuit, and the key SW is connected with the microcontroller U2, and the other end of the key SW is grounded.

Example Two

Figure 3:
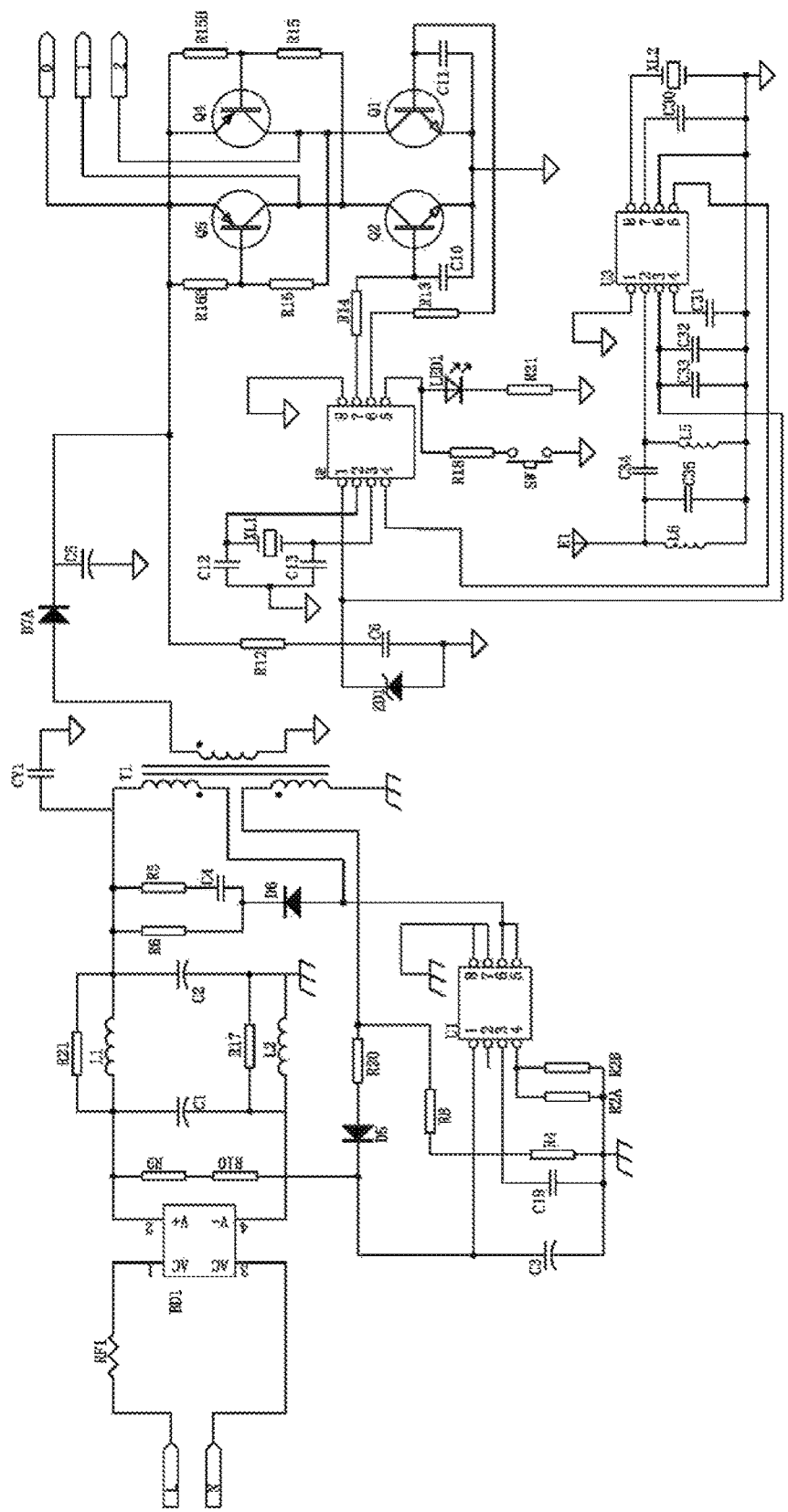
FIG. 3 is a circuit schematic diagram of a second embodiment of the invention.

The remote control signal receiving module is a radio frequency signal receiving circuit, as shown in FIG. 3, the radio frequency signal receiving circuit comprises an antenna E1, a coupling circuit, and a third chip U3, a signal output end of the antenna E1 is electrically connected with an input end of the coupling circuit, an output end of the coupling circuit is electrically connected with an input end of the third chip U3, and an output end of the third chip U3 is electrically connected with the control circuit. The type of the third chip U3 is WL490R. The coupling circuit comprises a fifth inductance L5, a sixth inductance L6, a thirty-fourth capacitance C34, and a thirty-fifth capacitance C35, an end of the sixth inductance L6 is connected with the output end of the antenna E1, the other end of the sixth inductance L6 is grounded, and the both ends of the thirty-fifth capacitance C35 are connected with the both ends of the sixth inductance L6 in parallel, one end of the thirty-fourth capacitance C34 is connected with one end of the thirty-fifth capacitance C35, and the other end of the thirty-fourth capacitance C34 is connected with one end of the fifth inductance L5, and the other end of the fifth inductance L5 is grounded. An input end of the third chip U3 is connected to the connection of the thirty-fourth capacitance C34 and the fifth inductance L5. A high frequency modulation signal received by the antenna E1 from the remote controller is provided to the third chip U3 through the coupling circuit, and the high frequency modulation signal is demodulation processed by the third chip U3.

Preferably, the radio frequency signal receiving circuit also comprises a power supply filter circuit, one end of which is electrically connected with the third chip U3, and the other end of the power supply filter circuit is grounded. The power supply filter circuit comprises a thirty-second capacitance C32 and a thirty-third capacitance C33, one end of the thirty-second capacitance C32 and of the thirty-third capacitance C33 is grounded, the other end of the thirty-second capacitance C32 and the thirty-third capacitance C33 is connected to a third pin of the third chip U3. The power supply filter circuit is used to filter the power supply inputted to the third chip U3.

Preferably, the radio frequency signal receiving circuit also comprises an automatic gain control circuit, one end of which is electrically connected with the third chip U3, and the other end of the automatic gain control circuit is grounded. The automatic gain control circuit comprises a thirtieth capacitance C30, one end of which is electrically connected with a seventh pin of the third chip U3, and the other end of the thirtieth capacitance C30 is grounded. The thirtieth capacitance C30 is used to reduce the control ripples of the automatic gain control circuit (AGC), to increase the dynamic range of the system.

Preferably, the radio frequency signal receiving circuit also comprises a threshold adjusting circuit, one end of which is electrically connected with the third chip U3, and the other end of the threshold adjusting circuit is grounded. The threshold adjustment circuit comprises a resistor arranged inside of the third chip U3 and a thirty-first capacitance C31 arranged outside of the third chip U3, a fourth pin is extending from inside of the third chip U3 by the resistor and then is electrically connected with the thirty-first capacitance C31, and the other end of the thirty-first capacitance C31 is grounded. Through the resistor and the thirty-first capacitance C31, extract the DC value of the demodulated signal, which is used to compare with the logical data, this comparison level threshold can be realized by regulating the thirty-first capacitance C31, in order to adapt to the different data rate.

Preferably, the radio frequency signal receiving circuit also comprises a crystal oscillator XL2, an end of which is electrically connected with an eighth pin of the third chip U3, the other end of the crystal oscillator XL2 is grounded.

Except the remote control signal receiving module of this example is different from that of the example one, the remaining structures are same as that of the example one.

Figure 4:
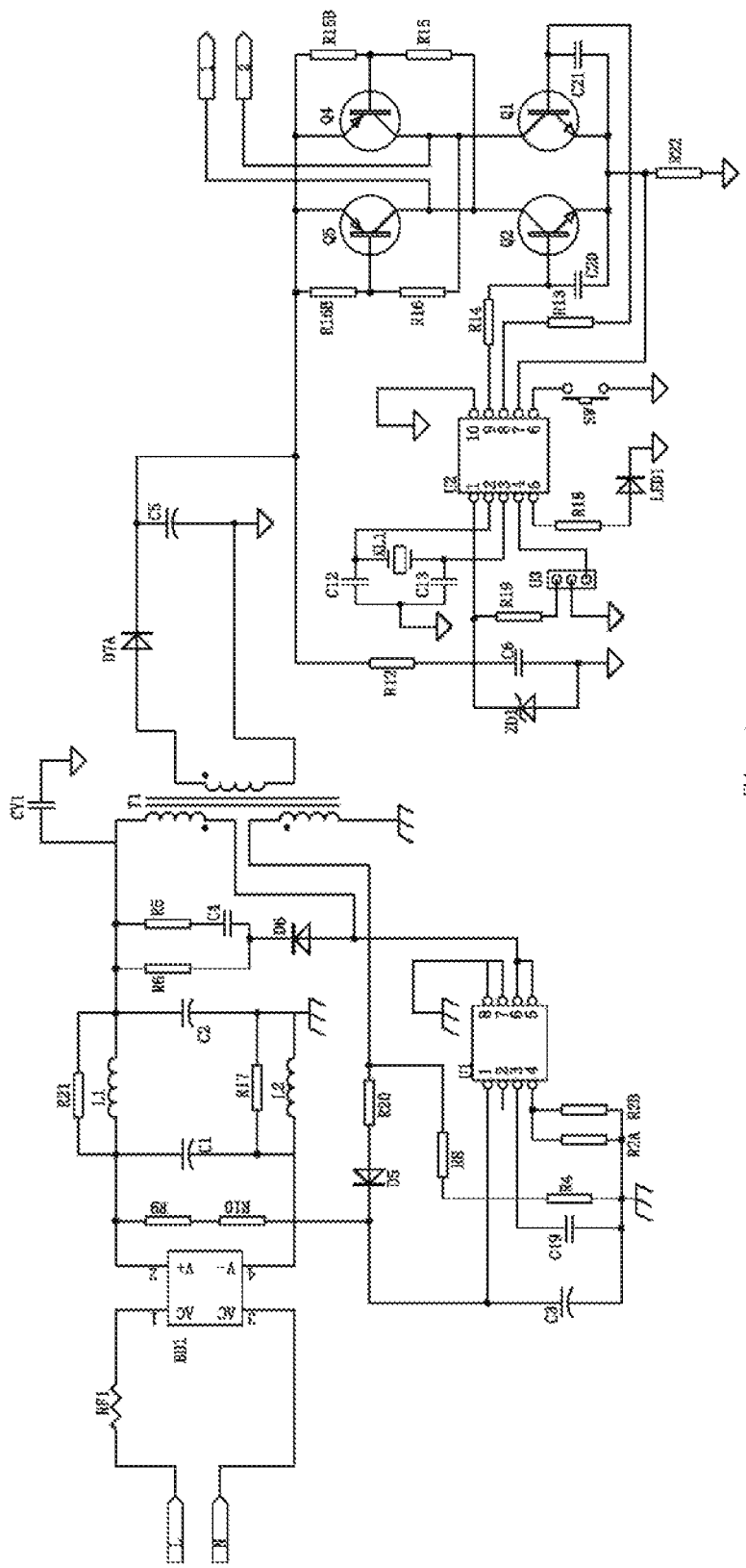
FIG. 4 is a schematic diagram of the addition of short-circuit protection on the basis of FIG. 2.
Figure 5:
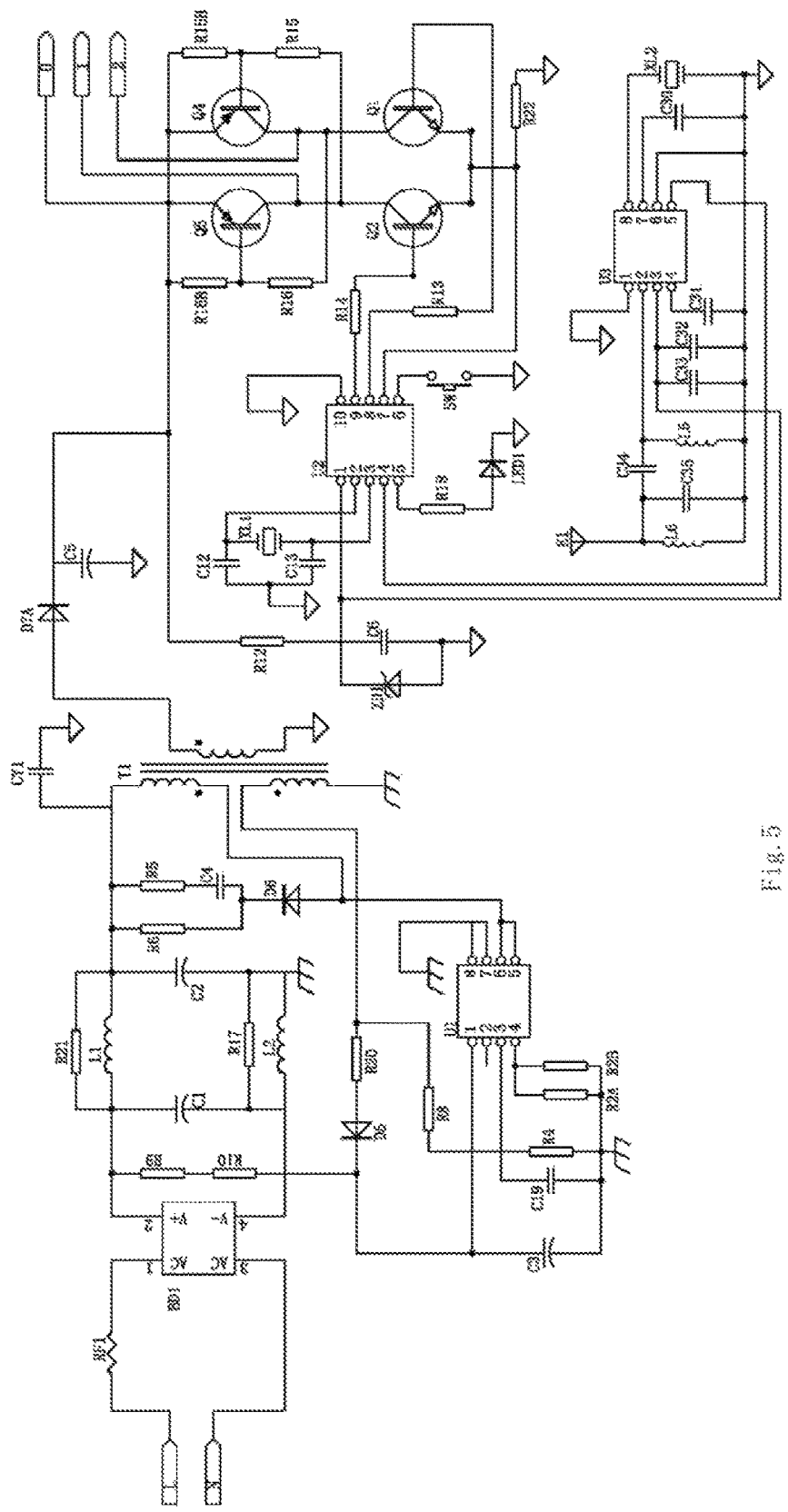
FIG. 5 is a schematic diagram of the addition of short-circuit protection on the basis of FIG. 3.
Figure 6:
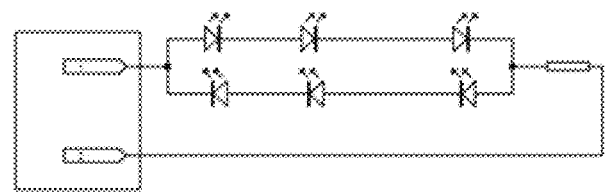
FIGS. 6 and 7 are schematic views of two different modes of the connection which can be connected with an output end of the invention.

For the above two examples, as shown in FIGS. 4 and 5, a short-circuit protection circuit is also provided in the circuit of FIGS. 4 and 5, one end of the short-circuit protection circuit is electrically connected with the drive circuit 4 and the control circuit 3 respectively, the other end of the short-circuit protection circuit is grounded. The short-circuit protection circuit comprises a sampling resistor R22, through which sampling the signals on the driver circuit 4, and the sampling signal is sent to the microcontroller U2, and thus judging whether there is a short circuit by the micro controller U2. In the circuit shown in FIGS. 4 and 5, the type of the microcontroller U2 is JT-042M.

The working process of the example one is as follows:

1. the DC power supply starts to work firstly after starting up, and then the DC voltage is built up on the fifth capacitance C5;

2. the DC outputted by the DC power is supplied to the microcontroller U2 and the infrared signal receiving circuit through the twelfth resistor R12, and then the microcontroller U2 and the infrared signal receiving circuit start to work;

3. the operating state of the output signal of the microcontroller U2 can be changed at any time through the key SW or the infrared remote control transmitter, thus changing the switch changes of the drive circuit, in order to change the flash changes of the LED string light;

4. the controller is switched into the timing mode by long pressing the key SW for 3 seconds or manipulating the timing button of the remote control transmitter, and start timer, and after 6 (or 8) hours the power supply is off, then after 18 (or 16 hours, or set the length of time for it) hours the power supply is on again, so cycles.

The working process of the example two is as follows:

1. the DC power supply starts to work firstly after starting up, and then the DC voltage is built up on the fifth capacitance C5;

2. the DC outputted by the DC power is supplied to the microcontroller U2 and the infrared signal receiving circuit through the twelfth resistor R12, and then the microcontroller U2 and the infrared signal receiving circuit work;

3. the operating state of the output signal of the microcontroller U2 can be changed at any time through the key SW or the infrared remote control transmitter, thus changing the switch changes of the drive circuit, in order to change the flash changes of the LED string light;

4. The controller is switched into the timing mode by long pressing the key SW for 3 seconds or manipulating the timing button of the remote control transmitter, and start timer, and after 6 (or 8) hours the power supply is off, then after 18 (or 16 hours, or set the length of time for it) hours the power supply is on again, so cycles.

We claim:

1. A controller of an LED for receiving a remote control signal, comprising:
    a DC power source comprising an output end;
    a remote control transmitter for issuing a control command by a user;
    a remote control signal receiving module for receiving a signal of the remote control transmitter, wherein the remote control signal receiving module comprises an output end and is electrically connected with the DC power source;
    a control circuit electrically connected with the output end of the remote control signal receiving module and of the DC power source, respectively, wherein the control circuit comprises an output end and converts a command signal from the remote control signal receiving module into a switching signal output;
    a drive circuit connected to the output end of the DC power source and of the control circuit, respectively, wherein the drive circuit is turned on or turned off under a control signal of the control circuit to control that the DC power source outputs to a load;
    wherein the remote control signal receiving module is a radio frequency signal receiving circuit;
    wherein the radio frequency signal receiving circuit comprises an antenna, a coupling circuit, and a third chip, wherein a signal output terminal of the antenna is electrically connected to an input terminal of the coupling circuit, and an output end of the coupling circuit is electrically connected with an input terminal of the third chip, and an output end of the third chip is electrically connected with the control circuit;
    and wherein the radio frequency signal receiving circuit further comprises an automatic gain control circuit, wherein one end of the automatic gain control circuit is electrically connected to the third chip, and the other end of the automatic gain control circuit is grounded.

2. The controller of an LED for receiving a remote control signal according to claim 1, further comprising a short-circuit protecting circuit, wherein one end of the short-circuit protecting circuit is electrically connected to the drive circuit and the control circuit, respectively, and the other end of the short-circuit protecting circuit is grounded.

3. A controller of an LED for receiving a remote control signal, comprising:
    a DC power source comprising an output end;
    a remote control transmitter for issuing a control command by a user;
    a remote control signal receiving module for receiving a signal of the remote control transmitter, wherein the remote control signal receiving module comprises an output end and is electrically connected with the DC power source;
    a control circuit electrically connected with the output end of the remote control signal receiving module and of the DC power source, respectively, wherein the control circuit comprises an output end and converts a command signal from the remote control signal receiving module into a switching signal output;
    a drive circuit connected to the output end of the DC power source and of the control circuit, respectively, wherein the drive circuit is turned on or turned off under a control signal of the control circuit to control that the DC power source outputs to a load;
    wherein the remote control signal receiving module is a radio frequency signal receiving circuit;
    wherein the radio frequency signal receiving circuit comprises an antenna, a coupling circuit, and a third chip, wherein a signal output terminal of the antenna is electrically connected to an input terminal of the coupling circuit, and an output end of the coupling circuit is electrically connected with an input terminal of the third chip, and an output end of the third chip is electrically connected with the control circuit;
    and wherein the radio frequency signal receiving circuit further comprises a threshold adjusting circuit, wherein one end of the threshold adjusting circuit is electrically connected to the third chip, and the other end of the threshold adjusting circuit is grounded.

4. The controller of an LED for receiving a remote control signal according to claim 3, further comprising a short-circuit protecting circuit, wherein one end of the short-circuit protecting circuit is electrically connected to the drive circuit and the control circuit, respectively, and the other end of the short-circuit protecting circuit is grounded.

* * * * *